United States Patent
Huang et al.

(10) Patent No.: US 9,622,425 B2
(45) Date of Patent: Apr. 18, 2017

(54) PLANT GROWING DEVICE

(71) Applicants: Chen-Cheng Huang, Taipei (TW);
Pao-Hao Huang, Taipei (TW);
Pao-Han Huang, Taipei (TW)

(72) Inventors: Chen-Cheng Huang, Taipei (TW);
Pao-Hao Huang, Taipei (TW);
Pao-Han Huang, Taipei (TW)

(*) Notice: Subject to any disclaimer, the term of this patent is extended or adjusted under 35 U.S.C. 154(b) by 414 days.

(21) Appl. No.: 14/015,442

(22) Filed: Aug. 30, 2013

(65) Prior Publication Data

US 2013/0340334 A1 Dec. 26, 2013

Related U.S. Application Data

(63) Continuation-in-part of application No. 12/831,463, filed on Jul. 7, 2010, now abandoned.

(30) Foreign Application Priority Data

Jul. 8, 2009 (TW) .............................. 098123058 A

(51) Int. Cl.
*A01G 31/00* (2006.01)
*A01G 9/02* (2006.01)
*A01C 1/04* (2006.01)
*A01G 1/04* (2006.01)

(52) U.S. Cl.
CPC ................ *A01G 9/02* (2013.01); *A01C 1/044* (2013.01); *A01G 1/046* (2013.01); *A01G 31/001* (2013.01); *A01G 2031/002* (2013.01)

(58) Field of Classification Search
CPC .......... A01C 1/04; A01C 1/042; A01C 1/044; A01C 1/046; A01G 1/002; A01G 1/046; A01G 9/02

USPC .................................................... 47/56, 59 S
See application file for complete search history.

(56) References Cited

U.S. PATENT DOCUMENTS

| | | | | |
|---|---|---|---|---|
| 2,893,168 | A * | 7/1959 | Kobs ......................... | A01C 1/02 47/56 |
| 3,524,279 | A * | 8/1970 | Adams .................... | A01G 9/104 47/64 |
| 3,810,329 | A * | 5/1974 | Lecuru ................... | A01G 9/104 206/423 |

(Continued)

FOREIGN PATENT DOCUMENTS

| WO | WO 8402827 | * | 1/1984 |
|---|---|---|---|
| WO | WO 9422287 | * | 3/1994 |

OTHER PUBLICATIONS

EP 2204085.*

*Primary Examiner* — Thien Thanh Pham
(74) *Attorney, Agent, or Firm* — LeClairRyan

(57) ABSTRACT

A plant growing device includes an envelope made of a vacuum formed film and having substantially planar first and second walls interconnected by a surrounding wall. A plant growing medium is enclosed by the envelope. The first and second walls each has a plurality of micro-holes, and a network of interconnected ribs that are indented from an outer surface of the first or second wall to define a plurality of flow guide channels. The second wall further has openings to receive plants. The first wall further has drain holes. The envelope has high air permeability due to the micro-holes while still possessing a relative high strength due to the network of ribs.

5 Claims, 6 Drawing Sheets

(56) References Cited

U.S. PATENT DOCUMENTS

| | | | | |
|---|---|---|---|---|
| 3,834,072 | A * | 9/1974 | Rack | A01G 1/002 47/56 |
| 3,955,319 | A * | 5/1976 | Smith | A01G 13/0268 47/56 |
| 4,251,951 | A * | 2/1981 | Heinstedt | A01G 9/088 211/126.2 |
| 4,785,578 | A * | 11/1988 | Grene | A01G 9/108 211/71.01 |
| 5,274,951 | A * | 1/1994 | Besing | A01C 1/044 111/900 |
| 5,379,550 | A * | 1/1995 | Beljaars | A01G 9/104 47/86 |
| 5,401,281 | A * | 3/1995 | Chamoulaud | A01G 31/00 47/56 |
| 5,974,732 | A * | 11/1999 | Saito | A01C 1/042 47/56 |
| 6,672,007 | B1 * | 1/2004 | Lai | A01G 27/02 47/79 |
| 7,624,536 | B2 * | 12/2009 | Schromm | A01G 9/02 40/645 |
| 2007/0193116 | A1 * | 8/2007 | Luckett | A01G 1/005 47/65.9 |
| 2013/0333285 | A1 * | 12/2013 | Buist | A01G 1/007 47/65.9 |

\* cited by examiner

PLANT GROWING DEVICE

CROSS-REFERENCE TO RELATED APPLICATION

This application is a Continuation-In-Part application of U.S. patent application Ser. No. 12/831,463, filed on Jul. 7, 2010.

BACKGROUND OF THE INVENTION

1. Field of the Invention

This invention relates to a plant growing device, more particularly to a plant growing device of the type that includes an envelope containing a plant growing medium.

2. Description of the Related Art

Various envelopes have been suggested in the art for the plant growing device of the above-mentioned type. For example, U.S. Pat. No. 6,415,548 discloses an envelope that is made from a sheet material and that is formed with slit pre-markings operable for drainage and for accommodating seeds.

U.S. Pat. No. 5,761,847 discloses a covering material for growing plants, which is made of a water-impermeable resin sheet of woven or nonwoven fabric having a basis weight of 20 to 100 g/m.sup.2, a visible-ray reflectance of more than 60%, and an air-permeability of 10 to 200 sec/100 cc. The resin sheet is formed from fibers, such as flash-spinning high density polyethylene fibers. This patent further discloses that, if the basis weight is less than 20 g/m.sup.2, the sheet will be too week to be used as the covering material for filling a substrate. On the contrary, if the basis weight exceeds 100 g/m.sup.2, a required air-permeability will not be provided. Accordingly, the basis weight is an important factor to optimize air-permeability and strength of the covering material.

SUMMARY OF THE INVENTION

The object of the present invention is to provide a plant growing device with an envelope that is made from a vacuum formed film, whose air permeability and strength may be controlled readily through the formation of micro-holes and ribs in the vacuum formed film.

According to one aspect of this invention, a plant growing device includes an envelope and a plant growing medium. The envelope is made of a vacuum-formed film and has substantially planar first and second walls, and a surrounding wall connected between the first and second walls. The plant growing medium is enclosed by the envelope, and includes a water-absorptive material selected from the group consisting of a polymeric foam, saw dust, charcoal, soil, sand, wood pulp, polymeric fibrous substances, and natural fiber materials.

Each of the first and second walls has a plurality of micro-holes extending therethrough, and a network of interconnected ribs. The rib are indented from an outer surface of a respective one of the first and second walls and are protruded inwardly from an inner surface of the respective one of the first and second walls to define a plurality of flow guide channels.

The second wall further has a plurality of openings that are in spatial communication with the flow guide channels and that are adapted to permit extension of plants. The openings are larger than the micro-holes. The first wall further has a plurality of drain holes each of which tapers inwardly from the inner surface of the first wall. The drain holes are in spatial communication with the flow guide channels and are larger than the micro-holes.

According to another aspect of the invention, a plant growing device comprises an envelope and a plant growing medium. The envelope is made of a sheet material and has substantially planar first and second walls, and a surrounding wall connected between the first and second walls. The growing medium is enclosed by the envelope, and includes a water-absorptive material selected from the group consisting of a polymeric foam, sawdust, charcoal, soil, sand, wood pulp, polymeric fibrous substances, and natural fiber materials. The second wall has a plurality of openings that are adapted to permit extension of plants. The first wall has a plurality of drain holes. At least one of the first and second walls is made of a vacuum formed film having a plurality of micro-holes extending therethrough, and a network of interconnected ribs. The ribs are indented from an outer surface of one of the first and second walls to define flow guide channels and protruded inwardly from an inner surface of the respective one of the first and second walls. The interconnected ribs define a plurality of rings each of which surrounds a group of the micro-holes.

The openings are larger than the micro-holes and in spatial communication with the flow guide channels when the second wall is made of the vacuum formed film. The drain holes are larger than the micro-holes and in spatial communication with the flow guide channels when the first wall is made of the vacuum formed film.

BRIEF DESCRIPTION OF THE DRAWINGS

Other features and advantages of the present invention will become apparent in the following detailed description of the preferred embodiments of this invention, with reference to the accompanying drawings, in which.

DETAILED DESCRIPTION OF THE PREFERRED EMBODIMENTS

Figure 1:
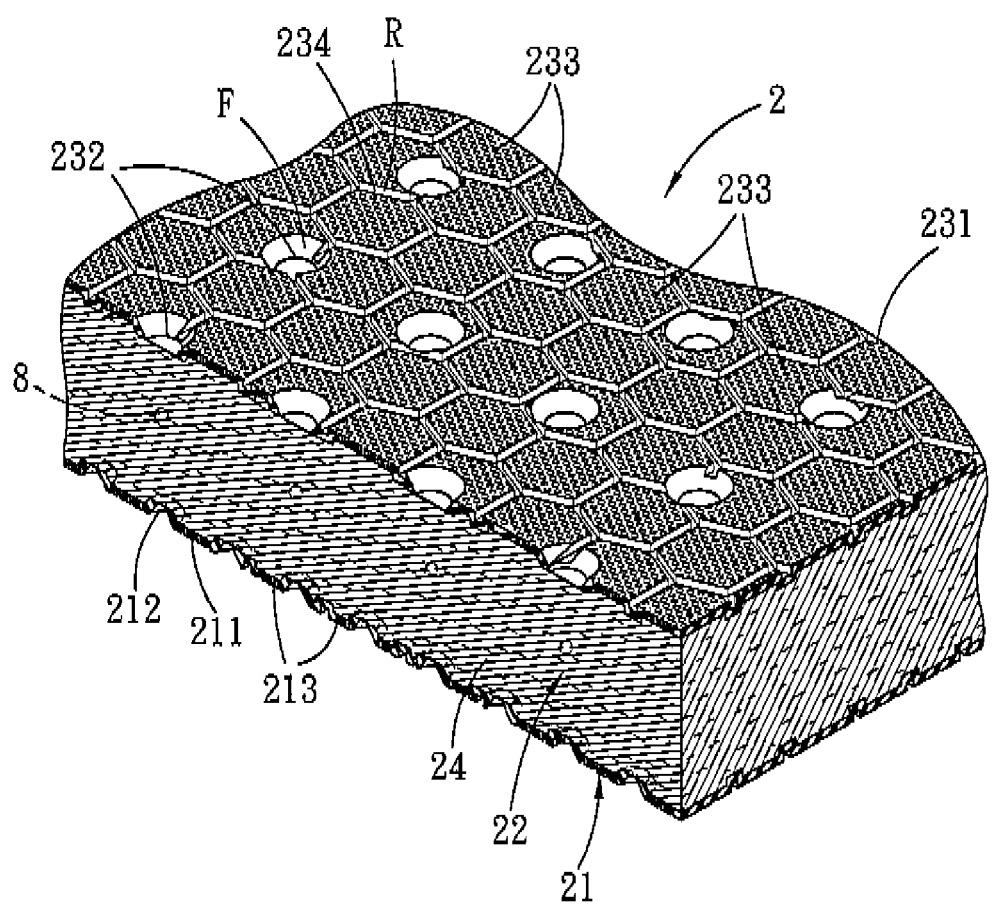
FIG. 1 is a fragmentary perspective view illustrating the first preferred embodiment of a plant growing device according to this invention.
Figure 2:
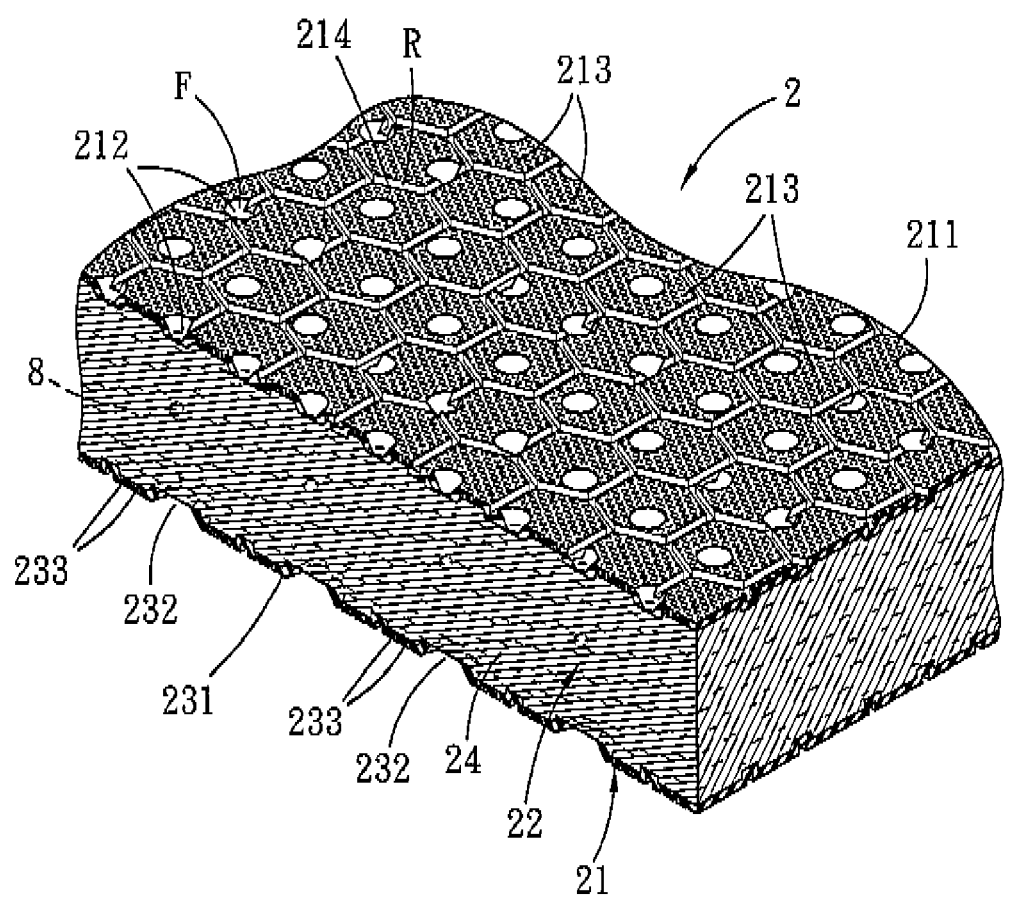
FIG. 2 is a fragmentary plan view illustrating a first wall of an envelope of the first preferred embodiment.
Figure 3:
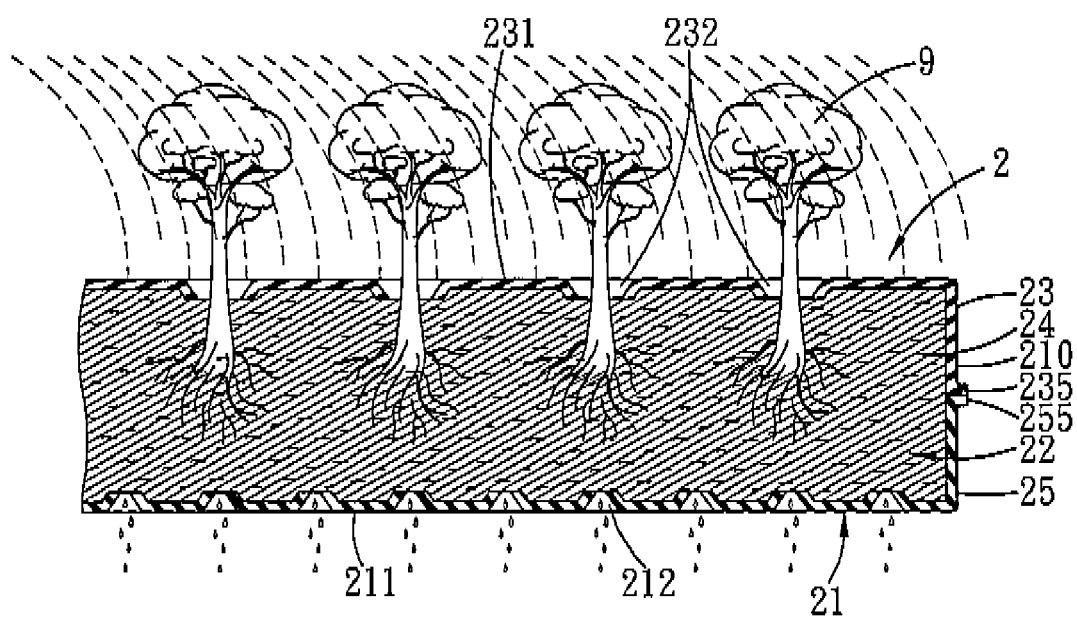
FIG. 3 is a fragmentary perspective view of the first preferred embodiment.

Referring to FIGS. 1 to 3, the first preferred embodiment of a plant growing device 2 according to the present invention is adapted to cultivate a plant. The plant growing device 2 includes an envelope 21 and a plant growing medium 22.

The envelope 21 is made of a vacuum formed film and has substantially planar first and second walls 211, 231, and a surrounding wall 210 that is connected between the first and second walls 211,231. Each of the first and second walls 211, 231 has a plurality of micro-holes 213, 233 extending therethrough, and a network of interconnected ribs (R). The ribs (R) are indented from an outer surface of a respective one of the first and second walls 211, 231 and are protruded inwardly from an inner surface of the respective one of the first and second walls 211, 231 to define a plurality of flow guide channels 214, 234. The interconnected ribs (R) define a plurality of rings each of which surrounds a group of the micro-holes 213, 233.

The second wall 231 further has a plurality of openings 232 that are in spatial communication with the flow guide channels 234 and that are adapted to permit extension of plants. The openings 232 are larger than the micro-holes 233. The second wall 231 further has a plurality of truncated cone-shaped annular flanges (F) each of which is connected directly to at least one of the ribs (R) of the second wall 231 and each of which projects and tapers inwardly from the inner surface of the second wall 231 to define one of the openings 232. Accordingly, the openings 232 taper inwardly.

The first wall 211 further has a plurality of drain holes 212 each of which tapers inwardly from the inner surface of the first wall 211. The drain holes 212 are larger than the micro-holes 213. The first wall 211 further has a plurality of truncated cone-shaped annular flanges (F) each of which projects and tapers inwardly from the inner surface of the first wall 211 to define one of the drain holes 212.

The micro-holes 213, 233 of the vacuum formed film contribute air permeability for the envelope 2, and the ribs (R) thereof enhance the strength of the envelope 2. Through a proper design of a mold for the vacuum formed film, the envelope 2 may have a relatively high air permeability while still exhibiting a relatively high strength. Because the annular flanges (F) that define the openings 232 are connected directly to the ribs (R), they have sufficient structural strength.

The micro-holes 213, 233 provide air permeability while still being able to prevent insects to enter the envelope 2. In addition, nutrient may be supplemented easily to the plant growing medium inside the envelope 2 through the micro-holes 233.

Because the flow guide channels 234 are in spatial communication with the openings 232, they are able to rapidly and evenly dispense water to the openings 232. By virtue of the micro-holes 233 and the flow guide channels 239, water can be quickly and uniformly directed into the plant growing medium 22.

Because of the micro-holes 213 and the flow guide channels 214 formed in the first wall 211, water may be distributed and drained evenly, thereby preventing root rot. On the other hand, as the drain holes 212 are larger than the micro-holes 213, when a large amount of water enters the envelope 2, the drain holes 212 are able to rapidly drain a large portion of water, and the remaining water may be drained slowly by the micro-holes 213.

In this embodiment, the envelope 21 is composed of first and second envelope halves 25, 23 that respectively have a substantially tray-like shape. The first envelope half 25 has the first wall 211 and a first portion of the surrounding wall 210. The second envelope half 23 has the second wall 231 and a remaining second portion of the surrounding wall 210. The first and remaining second portions of the surrounding wall 210 have peripheral ends 255, 235 that are bonded to each other by a high-frequency heat sealing process. While the first and second walls 211, 231 and the surrounding wall 210 are made of the vacuum formed film in this embodiment, at least one of the first and second walls 211, 231 and the surrounding wall 210 may be made of the vacuum formed film according to the present invention.

The vacuum formed film of the envelope may be a degradable plastic such as a photo degradable plastic, a disintegrable plastic, and a biologically degradable plastic.

In this embodiment, the vacuum formed film is degradable polyethylene or polypropylene, thereby being environmentally friendly.

Figure 4:
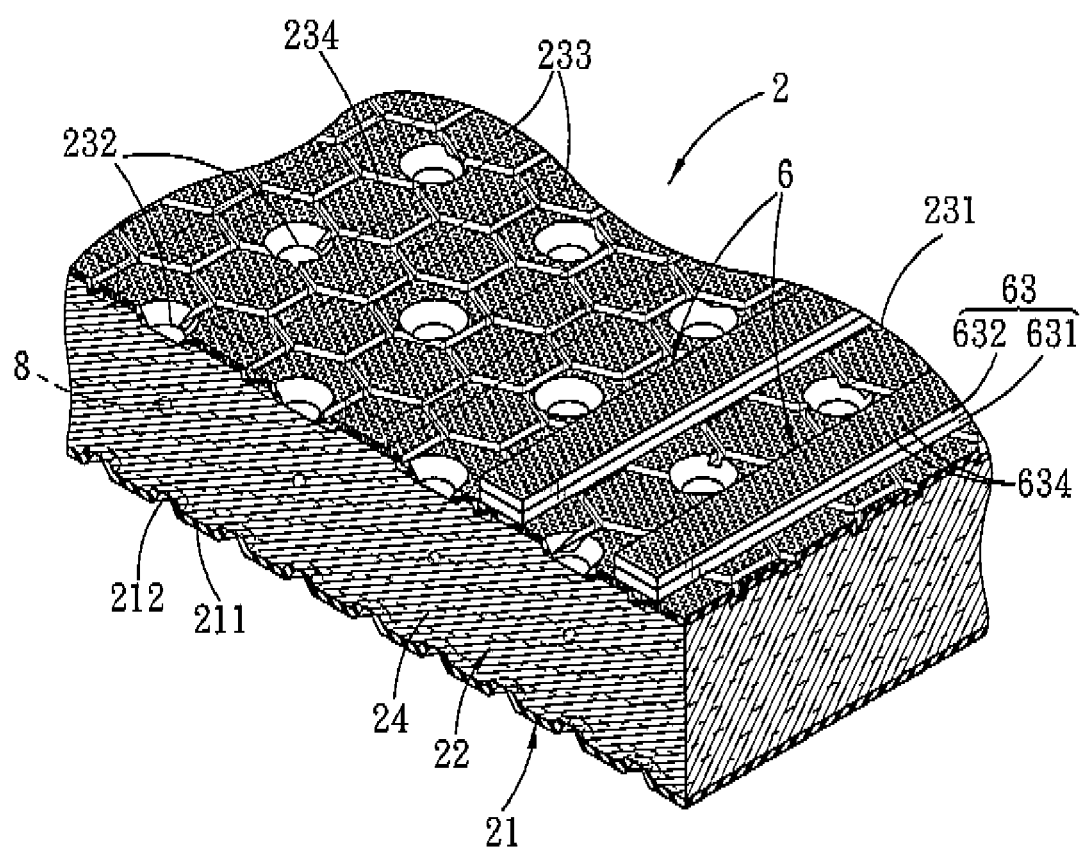
FIG. 4 is a fragmentary perspective view illustrating the second preferred embodiment of a plant growing device according to this invention.

Size of the openings 232 and distances between the openings 232 may be designed for the plants 9 such that the plants 9 are able to extend through the respective openings 232 when growing, and such that the plants 9 have enough space for growth after the same extend through the respective openings 232 (see FIGS. 3 and 4). Namely, the plants 9 extending through the respective openings 232 do not interfere with each other and are hence able to receive light.

The plant growing medium 22 is enclosed by the envelope 21, and includes a water-absorptive material that is selected from the group consisting of a polymeric foam, saw dust, charcoal, soil, sand, wood pulp, polymeric fibrous substances, and natural fiber materials. Seeds 8 are disposed in the plant growing medium 22. In this embodiment, the seeds 8 are mixed with the plant growing medium 22 during production of the plant growing device 2.

The plant growing medium 22 contains a nutrient 24 adapted to nourish the seeds 8 (i.e., the plants 9). The nutrient 24 may be an organic fertilizer, a chemical fertilizer, or a microbial fertilizer. Preferably, the nutrient 24 is predetermined so as to be optimal for the seeds 8 (i.e., the plants 9) and the plant growing medium 22. The nutrient 24 is uniformly mixed with the plant growing medium 22 such that the seeds 8 (i.e., the plants 9) are able to sufficiently absorb the nutrient 24.

Referring back to FIG. 3, when water is supplied to the plant growing device 2, the plant growing medium 22 is able to rapidly absorb water. Therefore, the plants 9 cultivated in the plant growing medium 22 can easily absorb water. After the plant growing medium 22 is saturated with water, excess water can be released via the drain holes 212 and can be prevented from staying in the plant growing medium 22. Consequently, stems and roots of the plants 9 are prevented from rotting.

Since the envelope 21 in this embodiment is made from polyethylene or polypropylene, the second wall 231 covering the plant growing medium 22 is able to prevent water in the plant growing medium 22 from easily evaporating. Thus, water can be conserved in the plant growing medium 22. Furthermore, humidity and a temperature of the plant growing medium 22 can be maintained. The plant growing device 2 is hence suitable for a dry environment. The envelope 21 is also capable of prohibiting pests and viruses from easily reaching the plant growing medium 22, thereby being able to protect the plants 9 cultivated in the plant growing medium 22.

When the plants 9 cultivated in the plant growing device 2 are required to be moved to a desired location, the plant growing device 2, which has the plants 9 cultivated therein, may be directly moved to the desired location since the envelope 21 securely encloses the plant growing medium 22. Consequently, the plants 9 are not necessary to be removed from the plant growing medium 22 for relocating.

Because the flow guide channels 234 are in spatial communication with the openings 232, they are able to rapidly and evenly dispense water to the openings 232.

Referring to FIG. 4, the second preferred embodiment of the plant growing device 2 according to the present invention is similar to the first preferred embodiment except that the second preferred embodiment of the plant growing device 2 further includes a plurality of nutrient supplements 6.

The nutrient supplements 6 are disposed on regions of an outer surface of the second wall 231, which do not cover the openings 232. Each of the nutrient supplements 6 includes a liquid permeable nutrient retainer 63 that is removably attached to the second wall 231, and a nutrient (not shown) that is held by the nutrient retainer 63 and that is adapted to nourish the seeds 8 (i.e., the plants 9). The nutrient retainer 63 includes first and second liquid permeable layers 631,632 that sandwiches the nutrient. The first liquid permeable layer 631 is removably attached to the second wall 231. First through-holes (not shown) are formed in the first liquid permeable layer 631, and second through-holes 634 are formed in the second liquid permeable layer 632. In this embodiment, the nutrient in the nutrient retainer 63 is water-soluble.

When water is supplied to the plant growing device 2, a portion of the water flows into the nutrient retainer 63 via the second through-holes 634 of the second liquid permeable layer 632 and subsequently flows out of the nutrient retainer 63 via the first through-holes of the first liquid permeable layer 631. The portion of the water, which flows into and out of the nutrient retainer 63, is able to carry a portion of the nutrient in the nutrient retainer 63 into the plant growing medium 22 through the micro-holes 233 and the flow guide channels 234. Thus, additional nutrition can be supplied to the plant growing medium 22. When one of the nutrient supplements 6 has insufficient nutrient therein, the same can be removed from the second wall 231 and replaced by a new nutrient supplement 6. As a result, the plant growing device 2 can be supplemented with unlimited nutrients.

Figure 5:
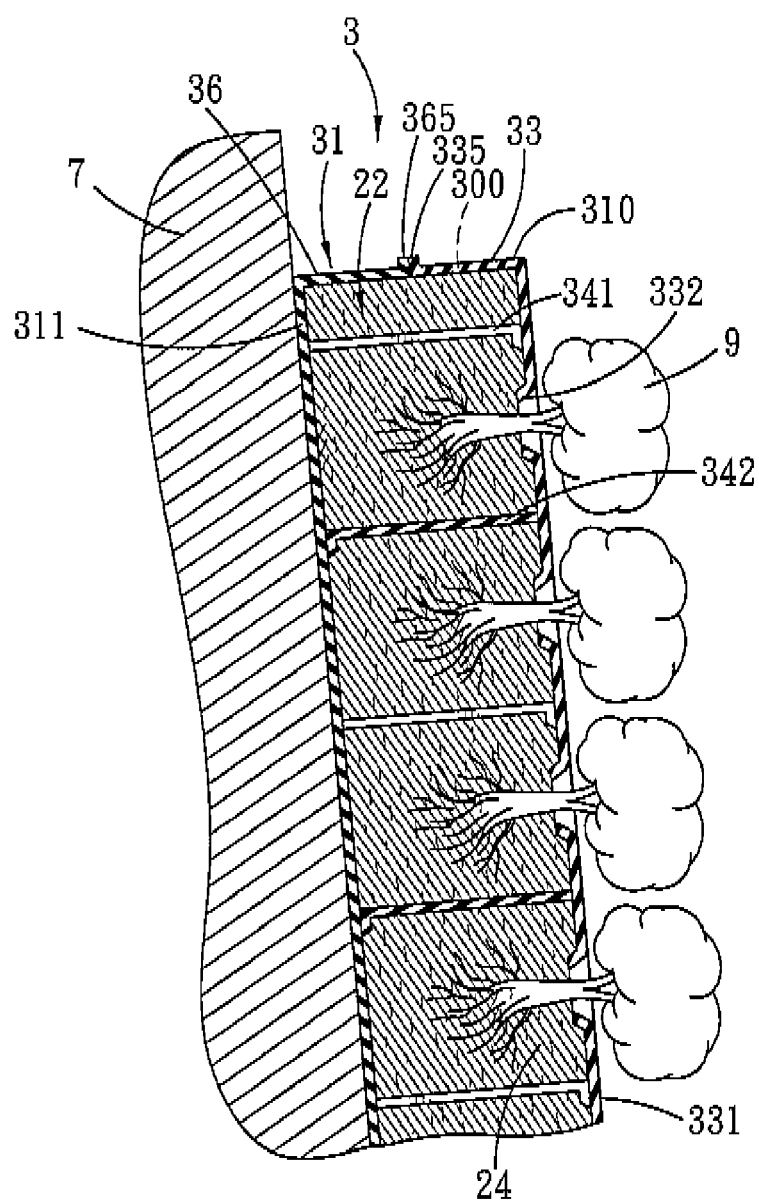
FIG. 5 is a fragmentary sectional view to illustrate the third preferred embodiment of a plant growing device according to this invention.
Figure 6:
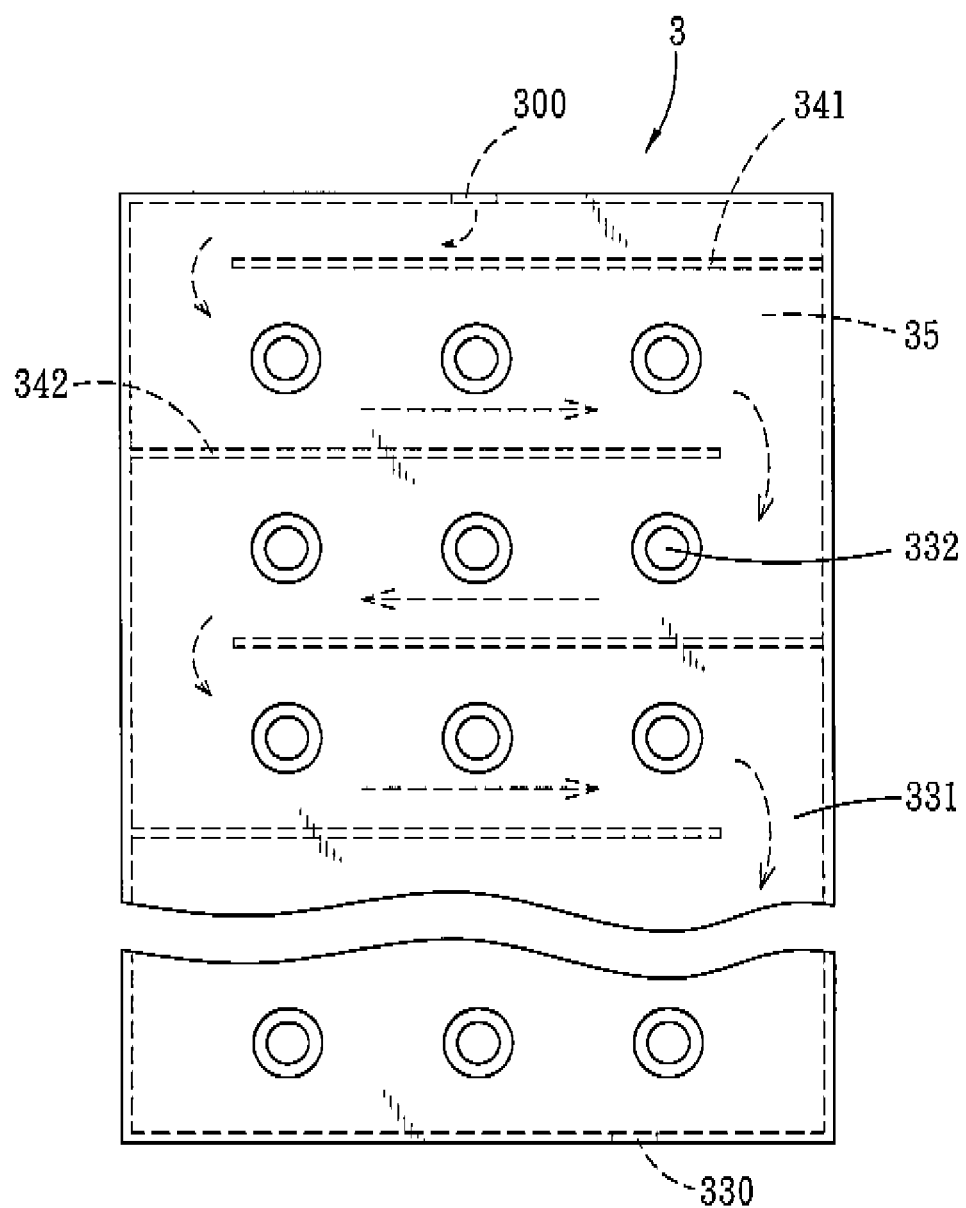
FIG. 6 is a schematic fragmentary view illustrating how a liquid can be directed by first and second flow diverting partitions of the third preferred embodiment.

FIGS. 5 and 6 show the third preferred embodiment of the plant growing device 3 according to the present invention. The third preferred embodiment is similar to the first preferred embodiment except for the following four differences. First, a drain hole 330 of the third preferred embodiment is formed in the surrounding wall 310 instead of the first wall 311. Secondly, the envelope 31 of the third preferred embodiment further includes a liquid entrance hole 300 extending through the surrounding wall 310. Specifically, the liquid entrance hole 300 and the drain hole 330 are formed on opposite first and second sides of the surrounding wall 310. Thirdly, the plant growing device 3 of the third preferred embodiment further includes a plurality of first and second flow diverting partitions 341,342 that are disposed within the envelope 31 in an alternating manner and in a direction transverse to the first and second walls 311,331. Each of the first flow diverting partitions 341 is connected to the first and second walls 311,331, and a third side of the surrounding wall 310. Each of the second flow diverting partitions 342 is connected to the first and second walls 311,331, and a fourth side of the surrounding wall 310 opposite to the third side. Fourthly, the plant growing device 3 of the third preferred embodiment is designed to be disposed vertically or obliquely by fixing the first wall 311 to a desired structure 7 (e.g., a wall).

The first and second flow diverting partitions 341, 342 divide an interior space of the envelope 31 into a plurality of rooms that are intercommunicated to form a multi-turn flow passage 35. When water flows into the plant growing medium 22 through the liquid entrance hole 300, water flows along the multi-turn flow passage 35 and is able reach each portion of the plant growing medium 22. Accordingly, each portion of the plant growing medium 22 is capable of sufficiently absorbing water. Excess water can be drained by virtue of the drain hole 330 in the surrounding wall 310. While the first and second flow diverting partitions 341, 342 are configured as partition plates in this embodiment, they should not be limited only thereto. The first and second flow diverting partitions 341, 392 may also be configured as heat sealed seams that are formed by thermal banding the second wall 331 to the first wall 311 through a high frequency heat sealing process and that divide the interior of the envelope 31 to form the multi-turn flow passage 35.

While the present invention has been described in connection with what are considered the most practical and preferred embodiments, it is understood that this invention is not limited to the disclosed embodiments but is intended to cover various arrangements included within the spirit and scope of the broadest interpretation and equivalent arrangements.

What is claimed is:

1. A plant growing device comprising:
   an envelope made from a sheet material, said envelope has substantially planar first and second walls, and a surrounding wall connected between said first and second walls; each of said first, second, and surrounding walls has an outer surface and an inner surface, wherein said inner surfaces of said first, second, and surrounding walls together define an interior space;
   a plant growing medium is enclosed within said interior space of said envelope, said plant growing medium includes a water-absorptive material selected from the group consisting of a polymeric foam, saw dust, charcoal, soil, sand, wood pulp, polymeric fibrous substances, and natural fiber materials;
   said first and second walls being made of a vacuum formed film; each of said first and second walls has a plurality of micro-holes extending therethrough and a network of interconnected ribs, said ribs being indented from the outer surface of a respective one of said first and second walls and protruded inwardly from the inner surface of the respective one of said first and second walls to define a plurality of flow guide channels;
   said second wall further having a plurality of openings that are in spatial communication with said flow guide channels of said second wall and are adapted to permit extension of plants, said plurality of openings being larger than said plurality of micro-holes; wherein said plurality of flow guide channels of said second wall are adapted to dispense water to the plurality of openings and into the plant growing medium;
   said first wall further having a plurality of drain holes each of which tapers inwardly from said inner surface of said first wall, said drain holes being in spatial communication with said flow guide channels of said first wall and larger than said plurality of micro-holes; and
   wherein said interconnected ribs of said first and second walls define a plurality of rings each of which surrounds a group of said micro-holes on said first and second walls.

2. The plant growing device as claimed in claim 1, wherein said first wall further has a plurality of annular flanges each of which projects and tapers inwardly from said inner surface of said first wall to define one of said drain holes.

3. The plant growing device as claimed in claim 1, wherein said second wall further has a plurality of annular flanges each of which projects and tapers inwardly from said inner surface of said second wall to define one of said openings.

4. The plant growing device as claimed in claim 3, wherein each of said annular flanges is connected directly to at least one of said ribs of said second wall.

5. The plant growing device as claimed in claim 1, wherein said vacuum formed film is a degradable plastic.

\* \* \* \* \*